(12) United States Patent
Cottereau et al.

(10) Patent No.: US 6,302,228 B1
(45) Date of Patent: Oct. 16, 2001

(54) DEVICE AND METHOD FOR REMOVING HEAT ENERGY FROM A COMPARTMENT

(75) Inventors: Marc Cottereau; Philippe Rhoumy, both of Laval (FR)

(73) Assignee: Solvay (Societe Anonyme) (BE)

( * ) Notice: Subject to any disclaimer, the term of this patent is extended or adjusted under 35 U.S.C. 154(b) by 0 days.

(21) Appl. No.: 09/379,116

(22) Filed: Aug. 23, 1999

(30) Foreign Application Priority Data

Aug. 24, 1998 (FR) .................................................. 98 10665

(51) Int. Cl.⁷ .................................................. B60K 11/00
(52) U.S. Cl. ............................................. 180/68.1; 180/69.2
(58) Field of Search ..................................... 454/137, 248, 454/250, 345, 365; 180/68.1, 68.5, 69.2

(56) References Cited

U.S. PATENT DOCUMENTS

| | | | |
|---|---|---|---|
| 2,104,768 | * | 1/1938 | Saunders .............................. 180/68.5 |
| 2,104,771 | * | 1/1938 | Saunders .............................. 180/68.5 |
| 3,616,871 | * | 11/1971 | West ................................... 180/68.1 |
| 4,201,121 | * | 5/1980 | Brandenburg, Jr. ................... 454/137 |
| 4,265,332 | * | 5/1981 | Presnall et al. ................. 180/68.1 X |
| 5,660,243 | * | 8/1997 | Anzalone et al. .................. 180/68.1 |
| 6,056,075 | * | 5/2000 | Kargilis .............................. 180/68.1 |

FOREIGN PATENT DOCUMENTS

| | | |
|---|---|---|
| 41 17 230 | 12/1991 | (DE) . |
| 2 667 549 | 4/1992 | (FR) . |

* cited by examiner

Primary Examiner—Michael Mar
(74) Attorney, Agent, or Firm—Larson & Taylor, PLC

(57) ABSTRACT

Removal of heat energy from a compartment containing a heat engine is effected by drawing air in from the compartment through at least one opening made in a duct which passes through the compartment and in which air, entering from one face of the compartment and opening to the outside to a reduced-pressure zone, flows.

10 Claims, 1 Drawing Sheet

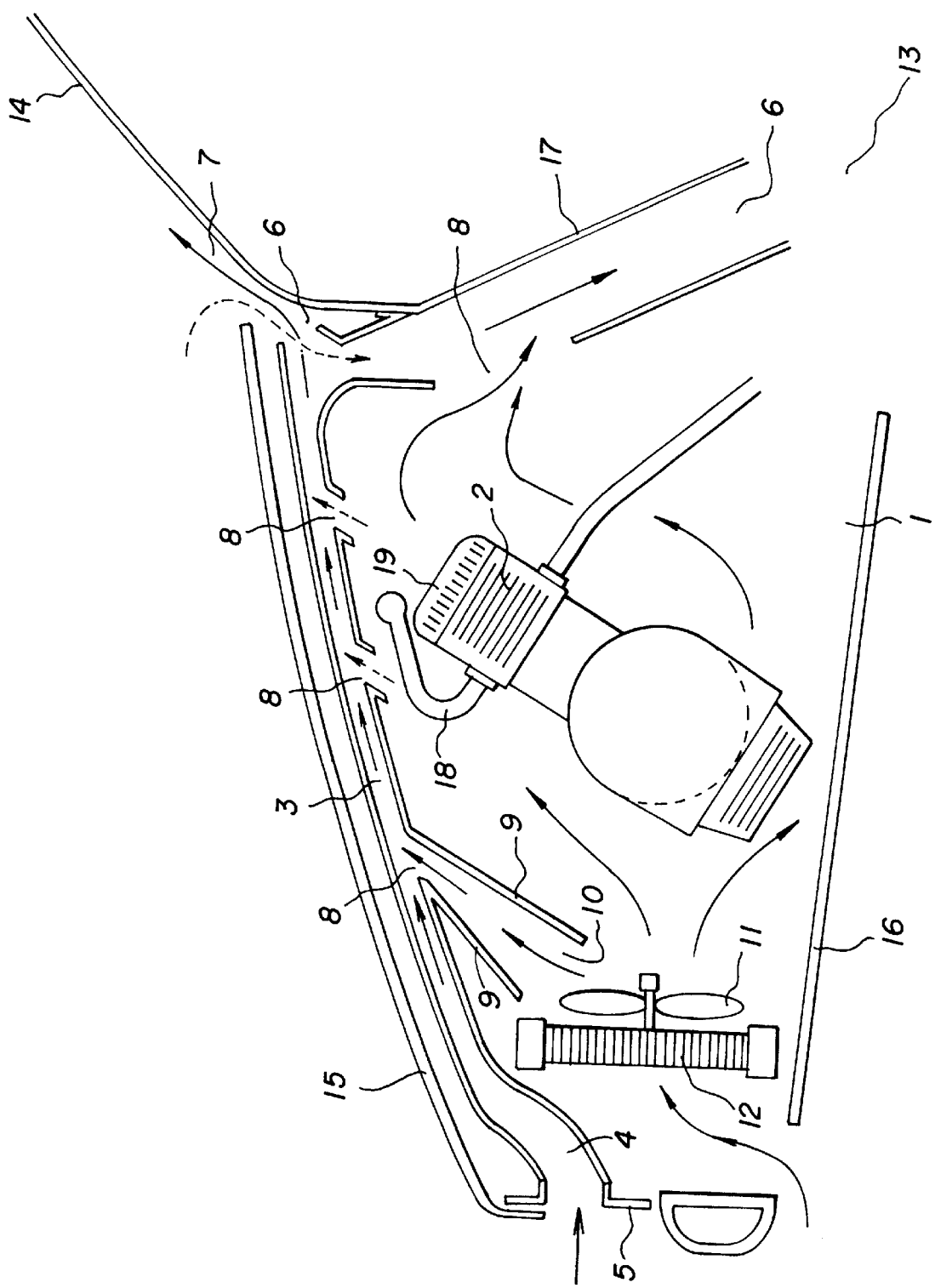

DEVICE AND METHOD FOR REMOVING HEAT ENERGY FROM A COMPARTMENT

FIELD OF THE INVENTION

The present invention relates to a device and to a method for removing heat energy from a compartment which contains a heat engine.

BACKGROUND OF THE INVENTION

Heat engines generally, in order to run under optimum conditions, need to be cooled constantly while they are running. For a very long time, water- or air-cooling circuits have been developed, these being supposed to keep the immediate surroundings of the combustion chambers at a temperature which never exceeds the highest temperature compatible with the integrity of the static or moving mechanical parts present in the engine.

Frequently, at the present time, the search is on to improve the isolation of engine compartments, so as to limit the odours given off and the transmission of vibration and undesirable noises. These new requirements, coupled with the fact that the empty space within engine compartments has tended to decrease because of the development of compact, lightweight vehicles, are partly responsible for the net temperature rise in the environment of the engine within the compartment.

Something else which is responsible for this rise in temperature has been the tendency to incorporate, around modern engines, an increasing number of accessories, such as the air compressor or turbocharger which operate at very high temperatures and generate additional hot spots in the engine compartment.

The result of this is a danger of excessive heating of the environment in the engine compartment which conventional cooling circuits will not be able to limit completely.

It has therefore become desirable to supply means of cooling this environment in order not to harm the overall efficiency of the engine and not to endanger the mechanical performance of certain components and accessories in its immediate vicinity.

For example, it has been proposed that a duct be fitted in the compartment to convey the fresh air drawn in by the cooling circuit fan towards the rear of the engine compartment so as to better distribute the inrush of fresh air throughout the volume of the compartment (French patent application 2667549).

Japanese patent application JP-08/164756 describes a motor vehicle bonnet which, on its internal face, has a broad, flat duct conveying fresh air taken from the front face of the vehicle towards the rear part of a transverse engine.

These various systems do, however, have the drawback of cooling only one of the hot zones of the environment. Furthermore, the flow rate and, therefore, the cooling efficiency of such systems are still low because they are confined to introducing fresh air and do not directly remove the energy from the hottest spots of the environment in the compartment.

The object of the invention is therefore to provide a device which cools all of the hotter zones of the environment in an engine compartment, whether these be moving or static parts, with satisfactory efficiency and which makes it possible to use various materials from which to make the peripheral components and accessories of the engine.

SUMMARY OF THE INVENTION

To this end, the invention relates to a device for removing heat energy from a compartment containing a heat engine using at least one duct, one end of which is of the compartment, which passes through the upper part thereof towards at least one zone which opens to the outside and in which the pressure is lower than or equal to the pressure in the compartment, characterized in that the duct has at least one opening via which ambient air present in the compartment is drawn into the duct.

The term "compartment" is intended to mean an open or closed space bounded by one or more walls or faces. One wall or part of a wall is mobile and can be opened to allow access to the engine contained in the compartment.

The heat engine present in the compartment is an engine which converts calorific energy supplied by the burning of a fuel into mechanical energy. It may consist of any type of internal combustion engine, of the rotary or piston type, running on liquid fuel (such as petrol, diesel, alcohol, for example) or gaseous fuel (such as petroleum gas, natural gas, lean gas, hydrogen, methane, for example).

By extension, the term "heat engine" is also intended to mean one or more electric motors powered by at least one fuel cell or accumulator battery.

The duct is arranged in such a way as to pass through the upper part of the compartment containing the heat engine. It may be embodied in various forms and be mounted in the compartment in any way allowing easy access for engine maintenance and providing good cover of the hottest zones in the environment.

It may, in particular, be fixed to the engine itself, or be secured to the compartment. As an alternative, it may also be secured to the openable wall of the compartment.

One of the ends of the duct acts as an inlet for the external air. According to the invention, this end is located in a colder zone in close proximity to one face of the compartment. This zone is situated, for example, behind the air intakes pierced in one face of the compartment.

As an alternative, it is possible to install a fan in the colder zone in proximity to the end of the duct, so as to draw in the external air more effectively and force it, at least in part, to enter the end of the duct.

The duct passes through the upper part of the compartment towards at least one zone which opens to the outside. This zone may be located at various points in the compartment. It is generally located in a part at the opposite end to the face via which the outside air enters the compartment.

The pressure in the zone opening to the outside is lower than or equal to the ambient pressure in the compartment. Advantageously, the pressure in this zone is lower than the pressure of the environment. The means for achieving this reduction in pressure compared with the inside of the compartment may be of varying nature. It is possible, for example, to use a fan placed in the compartment to create a positive pressure difference between the inside of the compartment and the outside or, alternatively, in cases where the compartment forms part of a moving vehicle, it is possible to make use of the creation of aerodynamic disturbances caused by the motion of the moving vehicle through the ambient atmosphere outside the compartment, the duct outlet being directed towards the zone or zones outside the compartment in which a depression would be created locally under the layers of air disturbed in this way. Such turbulent zones are generally created near sharp edges present in the shape of the moving vehicle or in the layer of air separating the moving vehicle from the ground. Their precise location and intensity depend on the exact shape of the moving vehicle and the speed with which it travels through the atmosphere.

According to the invention, the duct has at least one opening for drawing ambient air from the compartment into the duct by an ejection effect under the impulse of the speed of the outside air flowing through the duct.

At least one opening could judiciously be located in line with a hotter zone of the environment in the compartment.

As a preference, the duct has a narrowing cross section in the region of the end located in a colder zone intended for air inlet. Air from the outside is thus advantageously accelerated through a venturi effect.

In a preferred embodiment, the compartment contains a fan and the duct is equipped with at least one opening connected to a suction nozzle directed towards a zone located behind the fan, at a raised pressure compared with the rest of the environment in the compartment. When the compartment is stationary or forms part of a moving vehicle which is at a standstill, this embodiment has the advantage of not interrupting the removal of heat energy even though there is no reduced pressure zone in its immediate vicinity.

According to this preferred embodiment, the fan may or may not be associated with a radiator acting as a heat exchanger through which the engine coolant flows.

In another embodiment of the invention, the duct may be equipped with an acoustic silencer. The term "acoustic silencer" is intended to mean any device capable of preventing or at least of filtering the noise generated in the compartment. Any type of known acoustic silencer may be suitable. A baffle-type silencer is highly suitable, provided that the pressure drop introduced remains negligible compared with the pressure difference between the inside and the outside of the compartment. To be negligible, this pressure drop must remain below 40% of this pressure difference. As a preference, it must remain below 20% of this difference.

The duct may be made of any material suited to its residence in an engine compartment environment. In particular, it is preferable for plastic to be used as the material. All types of plastics may be suitable. Highly suitable plastics come into the category of thermoplastics or thermosets. Thermoplastics are quite particularly suitable.

Synthetic thermoplastics are preferred. Any type of thermoplastic polymer or copolymer whose mechanical and thermal properties are suited to the temperature conditions prevailing in the environment of the compartment are suitable. Examples of such thermoplastics are, without implying any limitation, polypropylene and polyamide. A mixture of polymers or of copolymers may also be used, as may a mixture of polymers with inorganic, organic and/or natural fillers such as, for example, but without implying any limitation, carbon, salts and other inorganic derivatives, natural or polymeric fibres.

The thermoplastic duct may be manufactured by any technique which is well known in itself in the field of the exploitation of plastics such as, for example, extrusion, extrusion-blow moulding, injection and injection-welding.

The duct may advantageously be manufactured by extrusion-blow moulding. The hollow body obtained may incorporate openings acting as suction inlets.

Advantageously, as an alternative of the device according to the invention, one or more elements associated with the operation of a heat engine may be incorporated into it. In particular, it may incorporate elements associated with the inlet of air, for example the housing for the air filter and/or at least one of the engine air inlet ducts.

In this alternative form, the device such as, in particular, the air filter-duct and/or, possibly, air inlet ducts, may be manufactured in a single operation in the form of a complex part with built-in elements or may, on the other hand, be the result of mounting the filter and/or inlet ducts manufactured separately and independently beforehand.

The device according to the invention is particularly well suited to removing heat energy from a motor vehicle engine compartment.

In this case, the end of the duct lying in a colder zone is advantageously located near one face of the vehicle. In particular, the colder zone to which the duct opens is the grille located on one face of the engine compartment. The duct is located in the upper part of this compartment, a short distance from the bonnet. One or more openings are made in the duct in line with the hottest parts of the engine, such as exhaust manifold, turbocharger, rocker cover.

One zone which opens to the outside is at the base of the windscreen, at a point where a depression is created as a result of the turbulent movement as the vehicle moves along at high speed. Another zone which opens to the outside is located at the lower part of the engine compartment. It generally opens out under the central part of the vehicle, where aerodynamic turbulence is also created as the vehicle moves along swiftly.

The duct may be secured to the bonnet. It may also, as an alternative, be fixed to the engine or to the compartment themselves.

As the vehicle moves along, the pressure front created at the point where it penetrates the atmospheric air, causes this atmospheric air to enter the duct which opens to the front face of the vehicle and forces the air to pass right along the length of this duct.

As a preference, the duct has a shape such that, in its initial part, its cross section decreases slightly and gradually compared with the end situated in a colder zone, thus producing a convergent nozzle. What this means is that the speed of the air passing through this convergent nozzle increases.

The single or multiple opening made in line with the hot spots of the engine may consist of a simple circular cutout or of a cutout of any closed shape, made in the duct. As an alternative, it may also consist of a collar produced in any way on a cutout in the duct, for example by bending the lips of the cutout outwards at right angles over a few centimetres.

In motor vehicle engine compartments it is also preferable for the duct to be fitted with a suction nozzle. In general, this nozzle is directed in close proximity to the rear of the fan with which the coolant circuit radiator is equipped.

The nozzle directed towards the fan may have a cylindrical shape or, as a preference, may be shaped as a cone frustum, the larger diameter being at the fan end.

When the vehicle is stationary, no air flow enters via the inlet face of the compartment and it is the fan/nozzle assembly which takes over in forcing air at high speed into the duct and feeding the ejectors arranged further on along this duct so as to draw in hot air from the compartment.

When the vehicle is moving along, the effect of the nozzle/fan assembly is added to the effect of the air which naturally flows into the duct because of the motion of the vehicle.

The device according to the invention has the advantage of allowing efficient removal of heat energy from an engine compartment even when this compartment forms part of a stationary piece of equipment or a moving body which remains stationary for long periods.

The present invention also relates to a method for removing heat energy from a compartment containing a heat engine, whereby ambient air is drawn out of the compartment through at least one opening made in a duct, the end of which is located in close proximity to a face of the compartment, which passes through the upper part thereof and opens to at least one zone opening to the outside where the pressure is lower than or equal to the pressure in the compartment and whereby the ambient air is discharged to the outside from the compartment.

A preferred embodiment of the method is characterized in that at least one opening is equipped with a suction nozzle directed towards a zone located behind a fan, at a raised pressure compared with the rest of the environment in the compartment.

The appended figure illustrates the invention without implying any limitation.

BRIEF DESCRIPTION OF THE DRAWINGS

The single FIGURE shows a diagram of a compartment for an engine of a motor vehicle in accordance with the invention.

DETAILED DESCRIPTION OF THE PREFERRED EMBODIMENTS

The FIGURE represents a diagram of a compartment (1) for an engine (2) of a motor vehicle, its engine compartment being situated at the front of the vehicle and delimited, at its front, by a grille (5), at the top, by a bonnet (15), at the bottom, by a panel (16) which isolates the engine from the space between the vehicle and the ground and, at the rear, by a bulkhead (17) which separates the engine compartment from the cabin. The compartment is extended and surmounted at the rear by a windscreen (14).

A duct (3), secured to the chassis of the compartment (1) is arranged under the bonnet (15) and runs along this bonnet so that it passes through the entire engine compartment from front to rear. This duct is of a flattened shape and its end (4) opens to a colder zone near the grille (5). It opens to the outside at two outlet zones (6) located, respectively, at the end of the bonnet (15) at the base of the windscreen (7) and in the lower rear part (13) of the compartment (1). The cross section and shape of the duct (3) are such that the pressure drops opposing the passage of air along the inside of the duct are negligible. Shortly after the inlet (4), the duct (3) narrows slightly, thus accelerating the air flow rate through a venturi effect.

When the vehicle is travelling along through the ambient air at a certain speed, aerodynamic turbulence is created in the zones at the base of the windscreen (7) and under the vehicle (13). This turbulence naturally gives rise to zones which are at a reduced pressure compared with the rest of the environment in the compartment. As a result, the flow of air from the outside, which rushes into the inlet (4) of the duct as soon as the vehicle is moving, is accelerated still further by the depression induced at (7) and at (13), and by the resulting suction effect.

Distributed along its length, the duct (3) has three openings (8) through which air from the engine compartment (1) can enter. Once the air is flowing at high speed through the duct (3), it draws ambient air from the compartment (1) in through the openings (8) through an ejector effect.

The first opening (8), located furthest towards the front of the engine (2) is connected to a divergent nozzle (9) directed towards the fan (11) located behind the coolant radiator (12). Its function is to collect air at a raised pressure from the zone (10) behind the fan and direct it into the duct (3) where it mixes with the air from the inlet (4) while at the same time increasing their speed through a venturi effect. The nozzle (9) allows the device according to the invention to operate when the vehicle is at a standstill and no air flow is entering through the inlet (4) but while the fan (11) is still running.

The openings (8) located behind the nozzle (9) are arranged on the duct (3) at points located in line with the hottest zones of the engine (2), that is to say the exhaust manifold (18) and the rocker cover (19).

The duct (3) is made of polyvinyl chloride and has been manufactured in the form of a hollow body obtained by the extrusion-blow moulding of a parison.

What is claimed is:

1. A device for removing heat energy from a compartment of a vehicle comprising at least one continuous duct located within the compartment, a portion of said duct being positioned between a heat engine within the compartment and a hood of the vehicle, said portion of the duct including a forward inlet opening positioned at a front end of the vehicle for forcing air into the duct when the vehicle is moving in a forward direction, a suction intake portion having an inlet opening positioned in a path of air flow from a fan within the compartment for directing air into said portion of the duct, at least one aspirator inlet opening which is configured for aspirating air from within the compartment into the duct, and at least one outlet opening for directing air to an outlet of the compartment and out of the vehicle.

2. The device according to claim 1, wherein a zone located behind said fan is at a raised pressure compared with the rest of the environment in the compartment.

3. The device according to claim 1, wherein the duct is equipped with an acoustic silencer.

4. The device according to claim 1, wherein the duct comprises a plastic material.

5. The device according to claim 1, wherein the duct includes a second portion positioned between the heat engine and a passenger compartment of the vehicle.

6. The device according to claim 1, wherein the compartment comprises an engine compartment of a motor vehicle.

7. The device according to claim 6, wherein said at least one outlet is located at a base of a windshield of the vehicle.

8. The device according to claim 6, wherein said at least one outlet is located in a lower part of the engine compartment.

9. A method for removing heat energy from a compartment containing a heat engine using a device having at least one continuous duct located within the compartment, a portion of said duct being positioned between a heat engine within the compartment and a hood of the vehicle, said portion of the duct including a forward inlet opening positioned at a front end of the vehicle for forcing air into the duct when the vehicle is moving in a forward direction, a suction intake portion having an inlet opening positioning in a path of air flow from a fan within the compartment for directing air into said portion of the duct, at least one aspirator inlet opening which is configured for aspirating air from within the compartment into the duct, and at least one outlet opening for directing air to an outlet of the compartment and out of the vehicle, said method comprising:

drawing ambient air out of the compartment through the at least one aspirator inlet opening and through the duct; and directing the air through said at least one outlet opening to the outlet of the compartment where the pressure is lower than or equal to the pressure in the compartment and out of the vehicle.

10. The method according to claim 9, wherein said device includes a zone located behind said fan having a raised pressure compared with the rest of the environment in the compartment.

* * * * *